US012736292B2

(12) United States Patent
Kwon et al.

(10) Patent No.: US 12,736,292 B2
(45) Date of Patent: Sep. 15, 2026

(54) DIFFUSER USING COLLISION OF VORTEX RINGS AND HEAT STORAGE TANK SYSTEM INCLUDING SAME

(71) Applicant: FT Energy, Ansan-si (KR)

(72) Inventors: Sung Gun Kwon, Seoul (KR); Jae Yeon Han, Seoul (KR)

(73) Assignee: FT Energy, Ansan-si (KR)

( * ) Notice: Subject to any disclaimer, the term of this patent is extended or adjusted under 35 U.S.C. 154(b) by 223 days.

(21) Appl. No.: 18/392,400

(22) Filed: Dec. 21, 2023

(65) Prior Publication Data

US 2024/0384940 A1 Nov. 21, 2024

(30) Foreign Application Priority Data

May 18, 2023 (KR) ........................ 10-2023-0064594

(51) Int. Cl.
*B05B 1/26* (2006.01)
*F28D 20/00* (2006.01)

(52) U.S. Cl.
CPC ............ *F28D 20/0039* (2013.01); *B05B 1/26* (2013.01); *F28D 2020/0069* (2013.01)

(58) Field of Classification Search
CPC F28D 20/0039; F28D 2020/0069; B05B 1/26
USPC .......................................................... 239/589
See application file for complete search history.

(56) References Cited

U.S. PATENT DOCUMENTS 2,894,895 A * 7/1959 Turner .................. C10G 33/02 204/666
3,141,000 A * 7/1964 Turner .................. C10G 33/02 239/524
4,374,724 A * 2/1983 Robinson .............. C10G 33/02 204/662
4,511,452 A * 4/1985 Robinson .............. C10G 33/02 204/662
6,168,702 B1 * 1/2001 Varadaraj .............. C10G 33/04 204/569
6,228,239 B1 * 5/2001 Manalastas ............ C10G 33/04 210/708
2003/0217971 A1 * 11/2003 Varadaraj ............ B01D 17/047 210/708

FOREIGN PATENT DOCUMENTS

JP 02-129676 A2 5/1994
JP 2000-304480 A2 11/2000
JP 2011-117686 A2 6/2011

* cited by examiner

*Primary Examiner* — Chee-Chong Lee
(74) *Attorney, Agent, or Firm* — Secant IP, P.L.L.C.

(57) ABSTRACT

A diffuser and a heat storage tank system including the same includes: a heat storage tank formed therein with an internal space in which hot water and cold water are stratified; an upper diffuser positioned in an upper space of the heat storage tank to supply water; and a lower diffuser positioned in a lower space of the heat storage tank to supply water, wherein each of the upper diffuser and the lower diffuser includes: a first nozzle formed on one side thereof with a first discharge port for discharging the water; and a second nozzle disposed at a predetermined distance from the first nozzle and having a second discharge port formed on one side thereof opposite to the one side of the first nozzle formed with the first discharge port.

12 Claims, 11 Drawing Sheets

DIFFUSER USING COLLISION OF VORTEX RINGS AND HEAT STORAGE TANK SYSTEM INCLUDING SAME

CROSS-REFERENCE TO RELATED APPLICATION

This application claims the benefit of Republic of Korea Patent Application 10-2023-0064594 (filed 18 May 2023). The entire disclosure of this priority application is hereby incorporated by reference herein.

BACKGROUND OF THE INVENTION

1. Field of the Invention

The present invention relates to a diffuser and a heat storage tank system including the same, and more particularly, to a diffuser and a heat storage tank system including the same to have high with efficiency simple manufacturing and installation.

2. Description of the Related Art

In general a heat storage tank system is provided to circulate water stored in a heat storage tank in a cooling cycle composed of a compressor, an evaporator and an expansion valve, and store water heated or cooled through heat exchange and supply the stored water to a load side for cooling or heating. The heat storage tank system generally accumulates and stores heat at night using late-night power and then supplies the heat to the load side during the day, so as to save energy while reducing power peaks.

A data center refers to a facility requiring air conditioning at a constant temperature and is also provided with a backup apparatus, since an air conditioning system is required to operate continuously without stopping even in the event of a power outage. A heat storage tank system is used to increase cooling storage efficiency of the backup apparatus.

In the heat storage tank system, as hot water and cold water in the heat storage tank quickly is stratified and a thinner thermocline layer is formed, losses in cooling storage and air-cooling are minimized and heat storage efficiency becomes high.

In the related art, a radial type diffuser and an octagonal pipe slot diffuser have been used to achieve stratification between hot water and cold water in heat storage tanks for open and closed systems. However, a storage capacity and an instantaneous heat dissipation amount also tend to become larger as cooling plants become larger.

When the instantaneous heat dissipation amount is increased, the diffuser is required to have a diameter increased for the high heat storage efficiency, and accordingly, high production costs and installation time are consumed. In order to solve the above problem, there are needs for research on a diffuser and a heat storage tank system to have high efficiency with simple manufacturing and installation.

SUMMARY OF THE INVENTION

The present invention provides a diffuser and a heat storage tank system including the same to stratify hot water and cold water using collision of vortex rings.

In addition, the present invention provides a diffuser and a heat storage tank system including the same to have high heat storage efficiency with simple manufacturing and installation.

The heat storage tank system according to the present invention includes: a heat storage tank formed therein with an internal space in which hot water and cold water are stratified; an upper diffuser positioned in an upper space of the heat storage tank to supply water; and a lower diffuser positioned in a lower space of the heat storage tank to supply water, wherein each of the upper diffuser and the lower diffuser includes: a first nozzle formed on one side thereof with a first discharge port for discharging the water; and a second nozzle spaced apart at a predetermined distance from the first nozzle and having a second discharge port formed on one side thereof opposite to the one side of the first nozzle formed with the first discharge port.

In addition, the first discharge port and the second discharge port may be provided as circular holes having the same diameter.

In addition, a reference line for connecting a center of the first discharge port to a center of the second discharge port may be perpendicular to a central axis of the heat storage tank.

In addition, the central axis of the heat storage tank may be positioned on the reference line for connecting the center of the first discharge port to the center of the second discharge port.

In addition, the heat storage tank system further includes: a third nozzle spaced at a predetermined distance from the first nozzle and formed on one side thereof with a third discharge port; and a fourth nozzle spaced apart at a predetermined distance from the third nozzle, and having a fourth discharge port formed on one side opposite to the one side of the third nozzle formed with the third discharge port, wherein the first reference line for connecting the center of the first discharge port to the center of the second discharge port and a second reference line for connecting a center of the third discharge port and a center of the fourth discharge port may be arranged parallel to each other.

In addition, the first reference line and the second reference line may be arranged at the same distance from the central axis of the heat storage tank, with the central axis interposed therebetween.

In addition, the diffuser according to the present invention disposed in a heat storage tank for supplying water includes: a first nozzle formed on one side thereof with a first discharge port; and a second nozzle having a second discharge port formed on one side thereof opposite to the one side of the first nozzle formed with the first discharge port.

In addition, the first discharge port and the second discharge port may be provided as circular holes having the same diameter.

In addition, a reference line for connecting a center of the first discharge port to a center of the second discharge port may be perpendicular to a central axis of the heat storage tank.

In addition, a reference line for connecting a center of the first discharge port to a center of the second discharge port may be positioned on a central axis of the heat storage tank.

In addition, the diffuser further includes: a third nozzle spaced apart at a predetermined distance from the first nozzle and formed on one side thereof with a third discharge port; and a fourth nozzle spaced apart at a predetermined distance from the third nozzle, and having a fourth discharge port formed on one side opposite to the one side of the third nozzle formed with the third discharge port, wherein the first reference line for connecting the center of the first discharge port to the center of the second discharge port and a second reference line for connecting a center of the third discharge port and a center of the fourth discharge port may be arranged parallel to each other.

In addition, the first reference line may be spaced apart at a predetermined distance from the central axis of the heat storage tank, and the second reference line may be spaced apart at the same distance as the spaced distance of the first reference line from the central axis of the heat storage tank.

According to the present invention, the heat storage tank system uses collision of vortex rings to stratify hot water and cold water, so that stable stratification can be implemented in a short period of time, and heat storage efficiency can be increased by creating a thin thermocline layer.

In addition, according to the heat storage tank system of the present invention, high storage efficiency can be maintained by miniaturizing the diffuser, costs can be saved with simple manufacturing and installation, and a high instantaneous heat dissipation amount can be implemented.

DETAILED DESCRIPTION OF THE INVENTION

Hereinafter, exemplary embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

In the specification herein, when one component is mentioned as being on other component, it signifies that the one component may be placed directly on the other component or a third component may be interposed therebetween. In addition, in drawings, thicknesses of layers and areas may be exaggerated to effectively describe the technology of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, in the following description of the embodiments of the present invention, the detailed description of known functions and configurations incorporated herein will be omitted when it possibly makes the subject matter of the present invention unclear unnecessarily.

Figure 1:
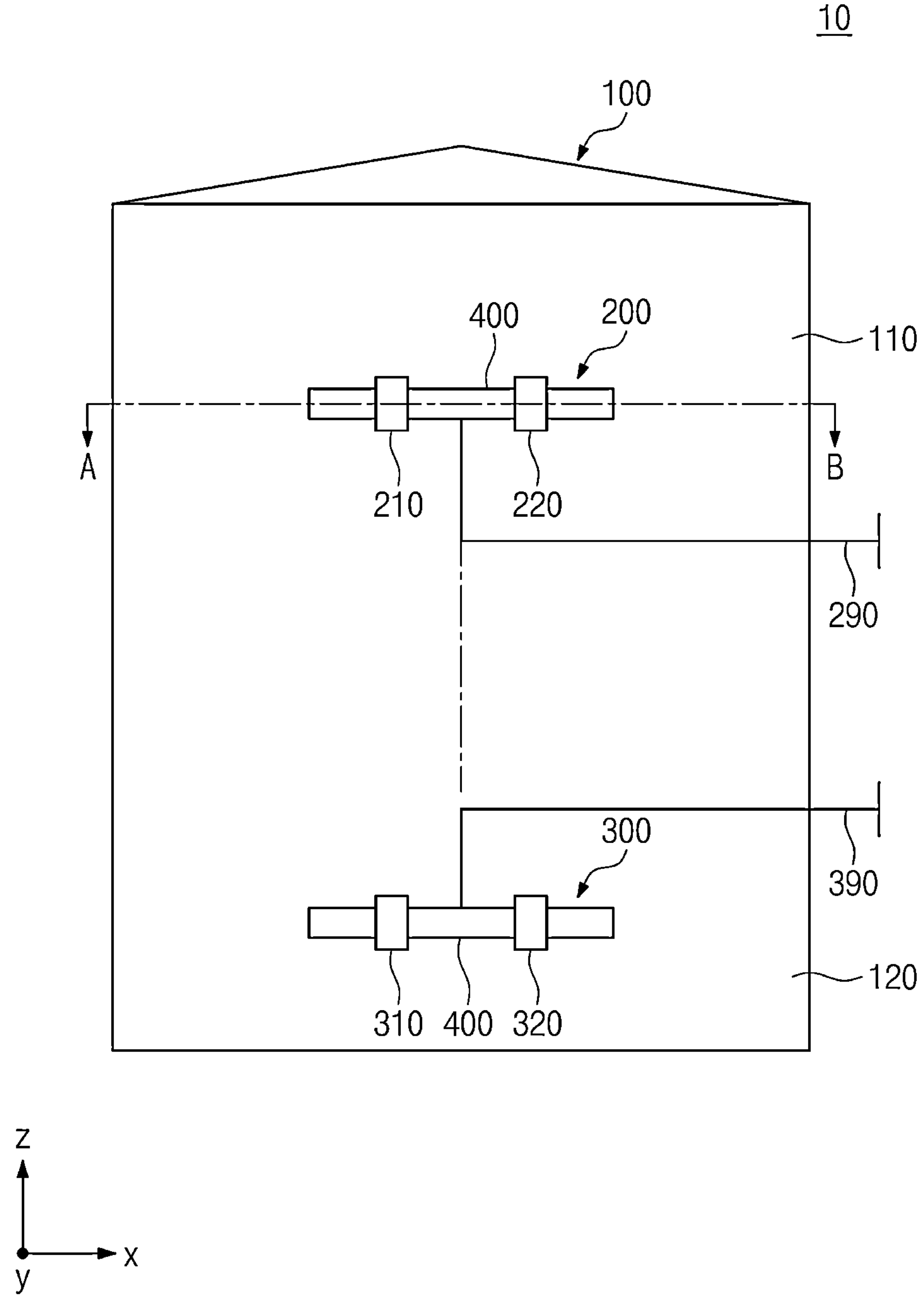
FIG. 1 is a view showing a heat storage tank system according to the embodiments of the present invention.
Figure 2:
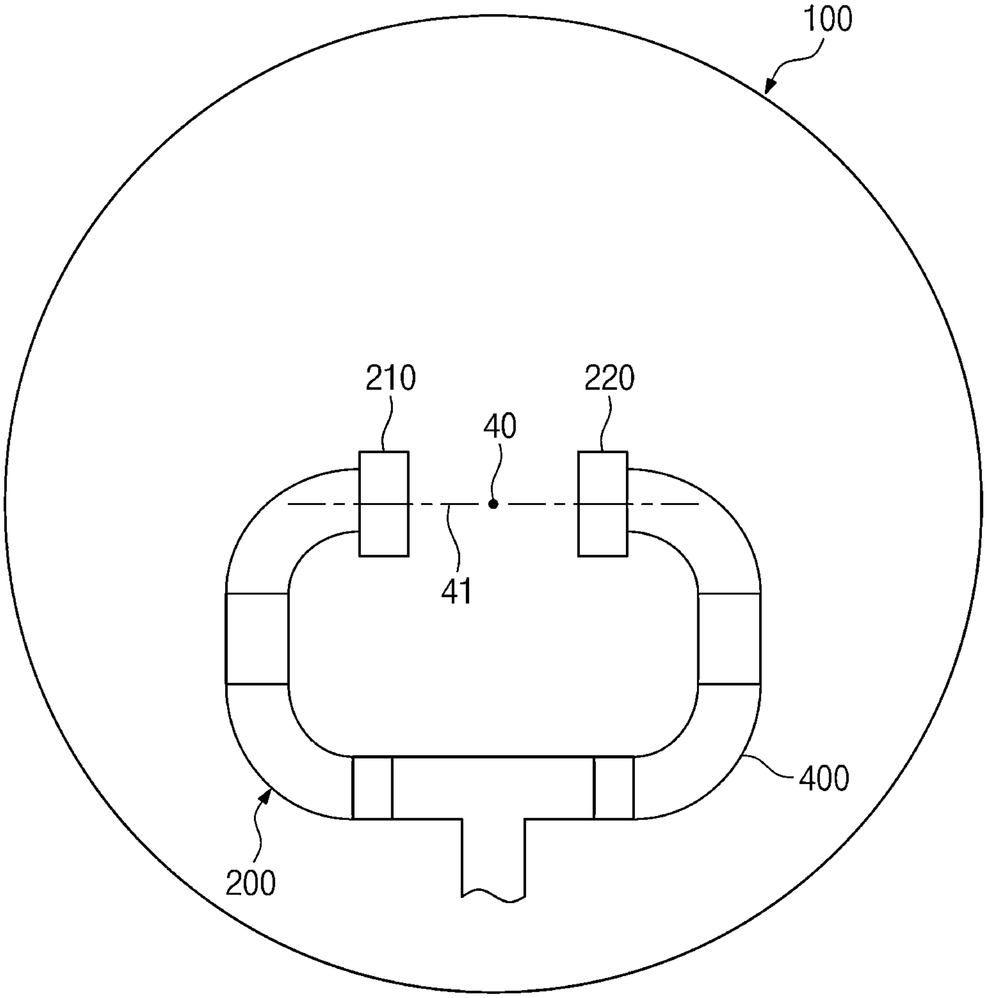
FIG. 2 is a sectional view taken along line A-B of FIG. 1.
Figure 3:
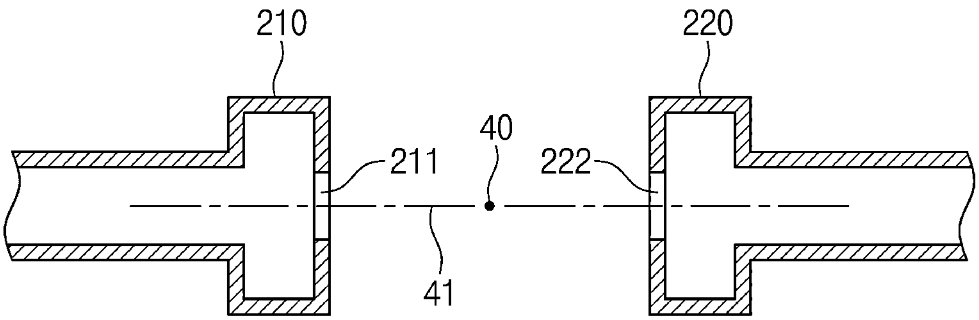
FIG. 3 is a view showing first and second discharge ports in FIG. 2.

FIG. 1 is a view showing a heat storage tank system 10 according to the embodiments of the present invention. FIG. 2 is a sectional view taken along line A-B of FIG. 1. FIG. 3 is a view showing first and second nozzles 210 and 220 in FIG. 2.

Referring to FIGS. 1 to 3, the heat storage tank system 10 according to the embodiments of the present invention may store hot water and cold water and supply the hot water and the cold water to the outside when necessary. Specifically, during storage of cooling, the hot water is circulated toward a freezer so as to be cooled, and the cooled cold water 30 is collected. In addition, during air-cooling, the cold water is supplied to the outside and the cold water having a temperature increased through heat exchange is collected. The heat storage tank system 10 may be used for cooling and heating in various facilities. According to the embodiment, the heat storage tank system 10 may be used as a backup apparatus for a data center. The heat storage tank system 10 may supply cold water 30 upon power outage in the data center such that an air conditioning system may operate continuously without stopping.

The heat storage tank system 10 of the present invention includes a heat storage tank 100, an upper diffuser 200, a lower diffuser 300, an upper circulation line 290 and a lower circulation line 390.

The heat storage tank 100 provides a space in which water may be stored. According to one embodiment, the heat storage tank 100 may be provided in a cylindrical shape. An central axis 40 of the heat storage tank 100 is positioned perpendicularly from the ground. According to another embodiment, the heat storage tank 100 may be provided as a pressure tank structure in which a body, an upper dome and a lower dome are combined with each other. The body is formed in a cylindrical shape having a predetermined diameter to have opened upper and lower surfaces, and the upper dome is formed in an upwardly convex hemisphere shape to cover the opened upper surface of the body. The lower dome is formed in a downward convex hemispherical shape to cover the opened lower surface of the body. In the following embodiment, the heat storage tank 100 will be described as being provided in a cylindrical shape as an example.

The internal space of the heat storage tank 100 is divided into an upper space 110 and a lower space 120, in which hot water is stored in the upper space 110 and cold water is stored in the lower space 120. The hot water and the cold water are stratified with a boundary layer interposed therebetween. The hot water and the cold water are maintained at a temperature lower than a room temperature. The cold water is maintained at a temperature lower than the hot water. According to the embodiment, the hot water may have a temperature of around 15° C. and the cold water may have a temperature of around 5° C.

The upper diffuser 200 is positioned in the upper space 110 of the heat storage tank 100 and connected to the upper circulation line 290. The upper diffuser 200 discharges hot water stored in the upper space 110 to the outside, or supplies hot water supplied along the upper circulation line 290 to the upper space 110.

The lower diffuser 300 is positioned in the lower space 120 of the heat storage tank 100 and connected to the lower circulation line 390. The lower diffuser 300 discharges cold water stored in the lower space 120 to the outside, or supplies cold water supplied along the lower circulation line 390 to the lower space 120.

The upper diffuser 200 and the lower diffuser 300 are provided with the same structure. Hereinafter, for convenience of description, the upper diffuser 200 will be described as an example.

The upper diffuser 200 includes a first nozzle 210, a second nozzle 220 and a supply pipe 400.

The first nozzle 210 is positioned in a central area of the heat storage tank 100 when viewed in a top view. The first nozzle 210 is provided in a cylindrical shape having a predetermined diameter. A central axis of the first nozzle 210 is arranged in a longitudinal direction parallel to the ground, and intersects perpendicularly to the central axis 40 of the heat storage tank 100. The first nozzle 210 is provided to have one side formed in a circular shape and having a central area formed therein with a first discharge port 211 through which hot water is discharged. The first discharge port 211 is provided as a circular hole having a predetermined diameter. A center of the first discharge port 211 is spaced apart at a predetermined distance from the central axis 40 of the heat storage tank 100.

The second nozzle 220 is spaced apart at a predetermined distance from the first nozzle 210 and provided to have the same size and shape as the first nozzle 210. A central axis of the second nozzle 220 is positioned on the same line as the central axis of the first nozzle 210. The first nozzle 220 is provided to have one side formed in a circular shape and having a central area formed therein with a second discharge port 222 through which hot water is discharged. The first discharge port 222 is formed on the one side of the second nozzle 220 facing the one side of the first nozzle 210 formed with the first discharge port 211.

The first discharge port 222 is provided in the central area of the one side of the second nozzle 220, and provided in the same size and shape as the first discharge port 211. The center of the second discharge port 222 and the center of the first discharge port 211 are positioned on the same line. A first reference line 41 for connecting the center of the second discharge port 222 to the center of the first discharge port 211 intersects perpendicularly with the central axis 40 of the heat storage tank 100, and the central axis 40 of the heat storage tank 100 is positioned on the first reference line 41.

The supply pipe 400 is provided to have a predetermined length, and each area has the same diameter. According to the embodiment, the supply pipe 400 generally has a U-shape. The supply pipe 400 has one end connected to the first nozzle 210 and an opposite end connected to the second nozzle 220. The supply pipe 400 is connected to the upper circulation line 290, and supplies hot water supplied from the upper circulation line 290 to the first nozzle 210 and the second nozzle 220. The supply pipe 400 has each area with the same diameter, so that the hot water may be supplied to each of the first nozzle 210 and the second nozzle 220 at the same flow rate and pressure.

As described above, the upper diffuser 200 may have a U-shape as a whole by connecting the first nozzle 210, the second nozzle 220 and the supply pipe 400.

Hereinafter, the process of stratifying hot water and cold water in the heat storage tank 100 through the above-described heat storage tank system 10 will be described in detail.

Figure 4:
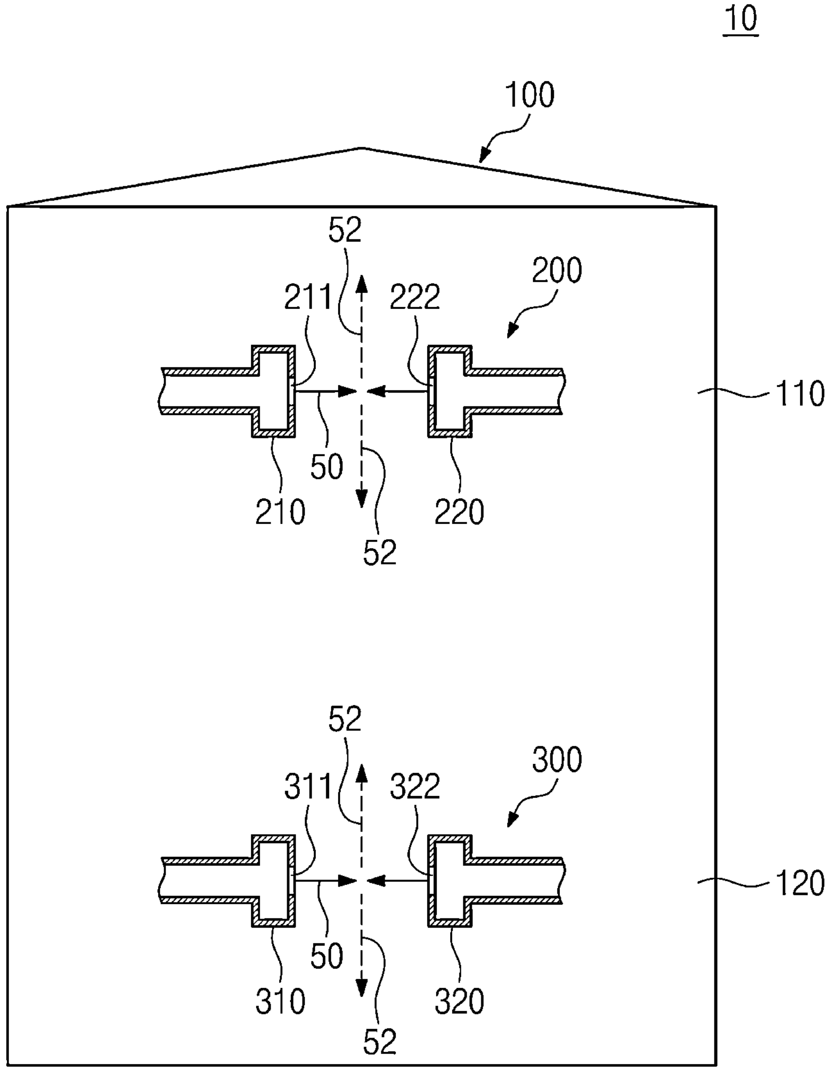
FIG. 4 is a view showing the operation of the heat storage tank system according to the embodiments of the present invention.
Figure 5:
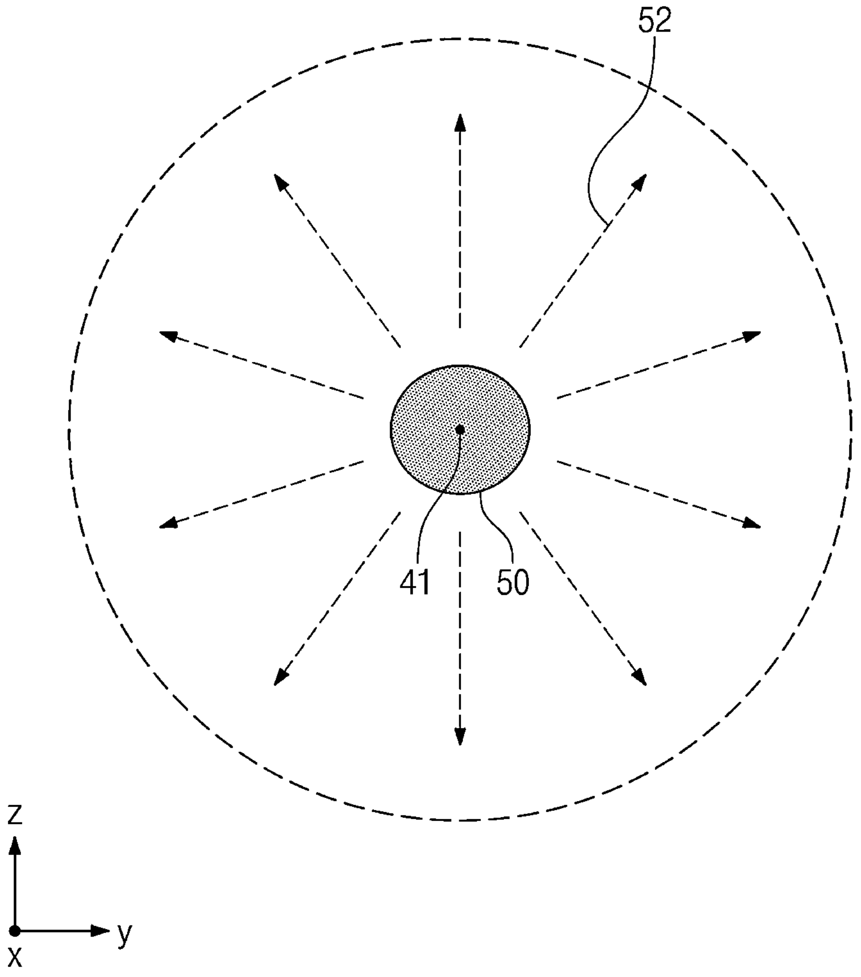
FIG. 5 is a view showing a vortex ring generated by water discharged from a first nozzle and a second nozzle according to the embodiments of the present invention.

FIG. 4 is a view showing the operation of the heat storage tank system 10 according to the embodiments of the present invention. FIG. 5 is a view showing a vortex ring 50 generated by water discharged from the first nozzle 210 and the second nozzle 220 according to the embodiments of the present invention.

Referring to FIGS. 4 and 5, hot water supplied through the upper circulation line 290 is discharged in a cylindrical shape from the first discharge port 211 and the second discharge port 222 of the upper diffuser 200, thereby forming two vortex rings 50. The two vortex rings 50 are recombined while colliding each other in the central area of the heat storage tank 100, thereby generating several secondary rings 52. The secondary rings 52 are radially scattered around the first reference line 41. The radially scattered secondary rings 52 are uniformly scattered upward, downward and laterally in the upper space 110 of the heat storage tank 100. In this process, the hot water is stratified in the upper space 110 of the heat storage tank 100 according to density.

The cold water supplied through the lower circulation line 390 is discharged in a cylindrical shape from the first discharge port 211 and the second discharge port 222 of the lower diffuser 300, thereby forming two vortex rings 50. The two vortex rings 50 are recombined while colliding each other in the central area of the heat storage tank 100, thereby generating several secondary rings 52. The secondary rings 52 are radially scattered around the first reference line 41. The radially scattered secondary rings 52 are uniformly scattered upward, downward and laterally in the lower space 120 of the heat storage tank 100. In this process, the cold water is stratified in the lower space 120 of the heat storage tank 100 according to density.

As described above, the hot water and the cold water may be stratified in the upper space 110 and lower space 120 of the heat storage tank 100 according to density, respectively, to achieve high efficiency.

Figure 6:
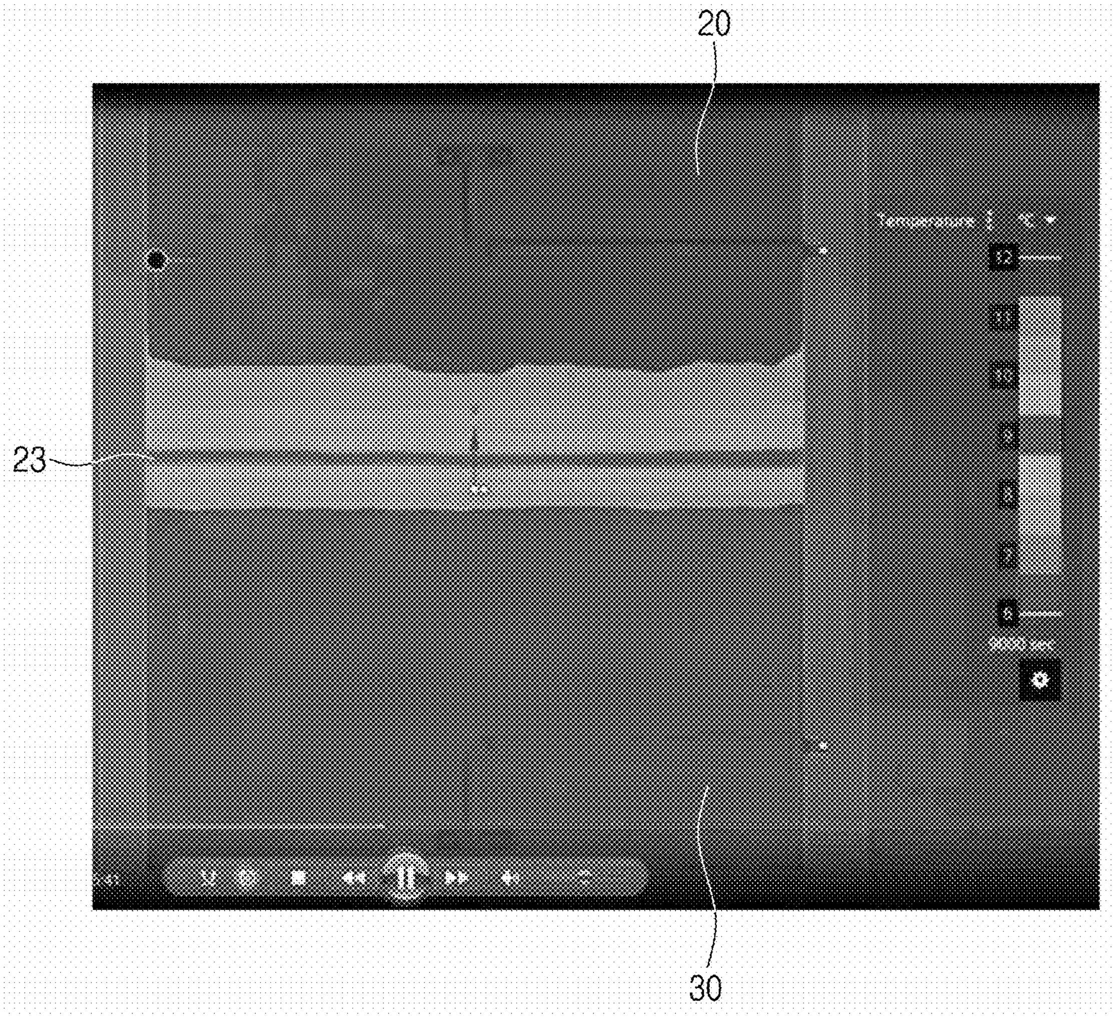
FIG. 6 is a view showing the temperature distribution of hot water and cold water inside the heat storage tank according to the embodiments of the present invention.

FIG. 6 is a view showing the temperature distribution of hot water and cold water inside the heat storage tank 100 according to the embodiments of the present invention.

Referring to FIG. 6, it can be seen that the hot water 20 and the cold water 30 are stratified inside the heat storage tank 100 according to the embodiments of the present invention, the thermocline layer 23 is formed to be thin between the hot water 20 and the cold water 30, and the temperature distribution appears clearly.

Hereinafter, the process of operating the heat storage tank system 10 of the present invention will be described in detail.

During storage of cooling, the cold water 30 supplied from the freezer is supplied to the lower diffuser 300 through the lower circulation line 390 of the heat storage tank 100 and discharged through the first discharge port 211 and the second discharge port 222, thereby forming vortex rings 50. Each vortex ring 50 are scattered through collision and recombination and descend to the bottom due to a density difference with the surrounding hot water 20. In the above process, the hot water 20 is pushed upward to an upper portion of the heat storage tank 100, introduced into the first discharge port 211 of the first nozzle 210 and the second discharge port 222 of the second nozzle 220 of the upper diffuser 200, and supplied to the freezer through the upper circulation line 290.

During air-cooling, the hot water 20 supplied from the outside of the heat storage tank 100 is supplied to the upper diffuser 200 through the upper circulation line 290 of the heat storage tank 100 and discharged to the first discharge port 211 and the second discharge port 222, thereby forming vortex rings 50. Each vortex ring 50 is scattered through collision and recombination, and pushed upward due to a density difference with the surrounding cold water 30. In this process, the cold water 30 is moved downward to the lower portion of the heat storage tank 100, introduced into the first discharge port 211 of the first nozzle 210 and the second discharge port 222 of the second nozzle 220 of the lower diffuser 300, and supplied to an air conditioner through the lower circulation line 390.

Through the above-described process, the boundary layer between the hot water 20 and the cold water 30 can be formed uniformly, quickly, and thinly. In addition, losses in the cooling storage and air-cooling due to the combination between the hot water 20 and the cold water 30 can be minimized.

Figure 7:
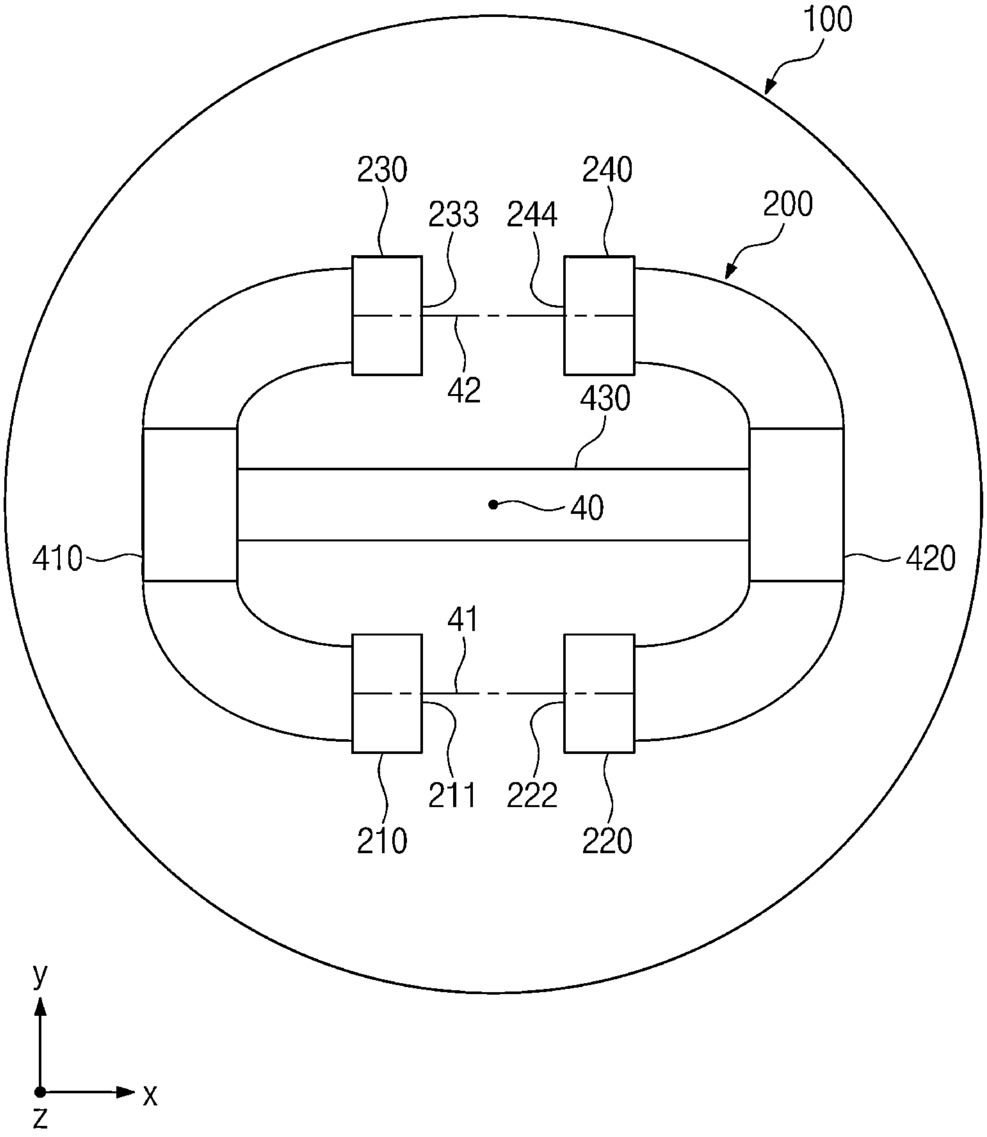
FIG. 7 is a view showing an upper diffuser according to the embodiments of the present invention.
Figure 8:
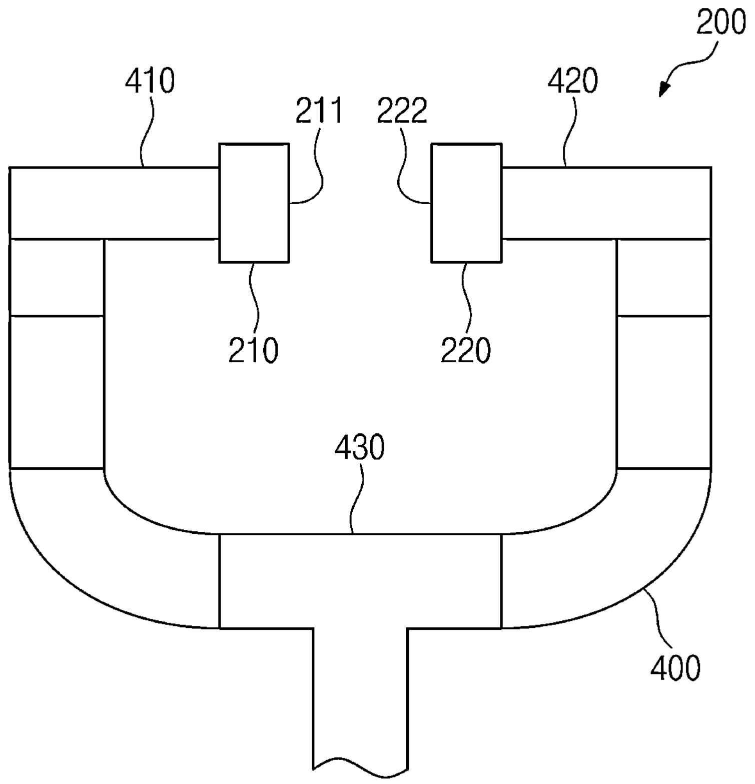
FIG. 8 is a front view showing the upper diffuser in FIG. 7.
Figure 9:
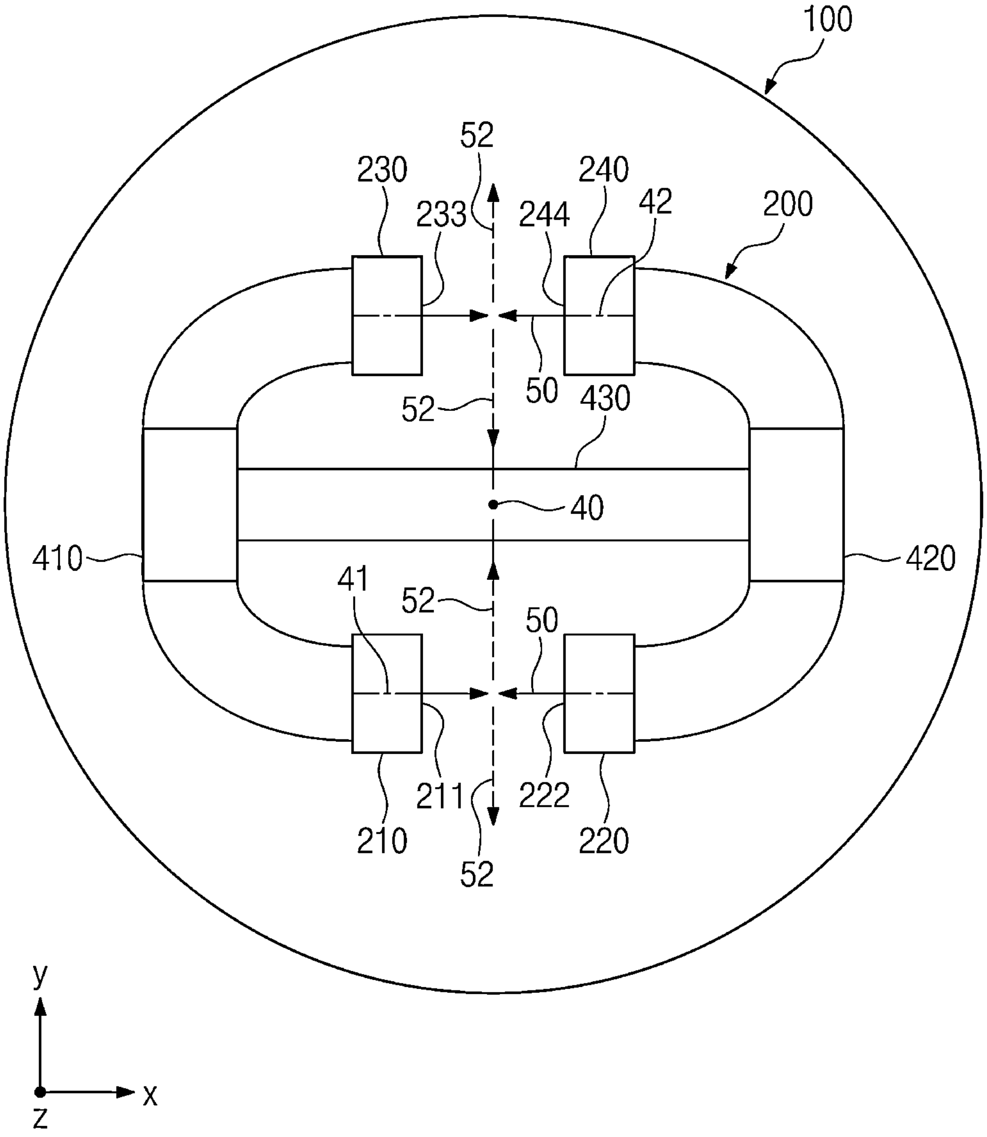
FIG. 9 is a view showing a driving process of the upper diffuser in FIG. 7.

FIG. 7 is a view showing the upper diffuser 200 according to another embodiment of the present invention. FIG. 8 is a front view showing the upper diffuser 200 in FIG. 7. FIG. 9 is a view showing the driving process of the upper diffuser 200 in FIG. 7.

Referring to FIGS. 7 to 9, the upper diffuser 200 may further include a first nozzle 210, a second nozzle 220, a third nozzle 230, a fourth nozzle 240 and a supply pipe 400.

The first nozzle 210 and the second nozzle 220 are provided in the same manner as the structure described in FIG. 3. When viewed in a top view, the first reference line 41 for connecting the center of the first discharge port 211 to the center of the second discharge port 222 is spaced apart at a predetermined distance from one side of the central axis 40 of the heat storage tank 100.

The third nozzle 230 is spaced apart at a predetermined distance from the first nozzle 210 and provided to have the same size and shape as the first nozzle 210. A central axis of the third nozzle 230 is arranged in a longitudinal direction parallel to the central axis of the first nozzle 210. The third nozzle 230 is provided to have one side formed in a circular shape and having a central area formed therein with a third discharge port 233 through which hot water is discharged.

The third discharge port 233 is provided in the same size and shape as the first discharge port 211. The center of the third discharge port 233 and the center of the first discharge port 211 are spaced apart at the same distance from the central axis 40 of the heat storage tank 100.

The fourth nozzle 240 is spaced apart at a predetermined distance from the third nozzle 230 and provided to have the same size and shape as the third nozzle 230. A central axis of the fourth nozzle 240 is positioned on the same line as the central axis of the third nozzle 230. The fourth nozzle 240 has one side formed in the same shape as the one side of the third nozzle 230 and having a central area formed therein with a fourth discharge port 244 through which hot water is discharged. The fourth discharge port 244 is formed on the one side of the fourth nozzle 240 facing the one side of the third nozzle 230 formed with the third discharge port 233.

The fourth discharge port 244 is provided in the same size and shape as the third discharge port 233. The center of the fourth discharge port 244 is positioned on the same line as the center of the third discharge port 233. The second reference line 42 for connecting the center of the fourth discharge port 244 to the center of the third discharge port 233 is arranged parallel to the first reference line 41. The second reference line 42 and the first reference line 41 are spaced apart at the same distance from the central axis 40 of the heat storage tank 100 with the central axis 40 of the heat storage tank 100 interposed therebetween.

The supply pipe 400 has a predetermined length and each area has the same diameter. The supply pipe 400 has a first area 410, a second area 420 and a third area 430.

The first area 410 is one area of the supply pipe 400 and spaced apart a predetermined distance from the central axis 40 of the heat storage tank 100. The first area 410 has one end connected to the first nozzle 210 and an opposite end connected to the third nozzle 230. The first nozzle 210 and the third nozzle 230 are connected to each other by the first area 410.

The second area 420 is spaced apart from the central axis 40 of the heat storage tank 100 by the same distance as the first area 410, and faces the first area 410 with the central axis 40 of the heat storage tank 100 interposed therebetween. The second area 420 has the same length as the first area 410. The second area 420 has one end connected to the second nozzle 220 and an opposite end connected to the fourth nozzle 240. The second nozzle 220 and the fourth nozzle 240 are connected to each other by the second area 420.

Due to the above-described connection structure, the structure in which the first nozzle 210, the first area 410 of the supply pipe 400 and the third nozzle 230 are connected, and the structure in which the second nozzle 220, the second area 420 of the supply pipe 400 and the fourth nozzle 240 are connected are symmetrical to each other about the central axis 40 of the heat storage tank 100.

The third area 430 is provided to have a predetermined length, and has one end connected to the first area 410 and an opposite end connected to the second area 420. In addition, the third area 430 is connected to the upper circulation line 290. The hot water 20 supplied from the upper circulation line 290 is supplied to the first area 410 and the second area 420 through the third area 430 of the supply pipe 400, in which the hot water 20 supplied to the first area 410 is discharged into the heat storage tank 100 through the first nozzle 210 and the third nozzle 230, and the hot water 20 supplied to the second area 420 is discharged into the heat storage tank 100 through the second nozzle 220 and the fourth nozzle 240. The hot water 20 discharged from the first nozzle 210 and the hot water 20 discharged from the second nozzle 220 form vortex rings 50, respectively, are combined with each other while colliding, and then form several secondary rings 52. In addition, the hot water 20 discharged from the third nozzle 230 and the hot water 20 discharged from the fourth nozzle 240 form vortex rings 50, respectively, are recombined with each other while colliding, and then form several secondary rings 52.

The collision of the vortex rings 50 formed by the first nozzle 210 and the second nozzle 220 and the collision of the vortex rings 50 formed by the third nozzle 230 and the fourth nozzle 240 have sizes and positions symmetrical about the central axis 40 of the heat storage tank 100.

Accordingly, the hot water 20 may be stratified with a uniform density inside the heat storage tank 100.

The lower diffuser 300 may be provided in the same structure as the above-described upper diffuser 200. Accordingly, the cold water 30 may be stratified with a uniform density in the lower space 120 of the heat storage tank 100.

Figure 10:
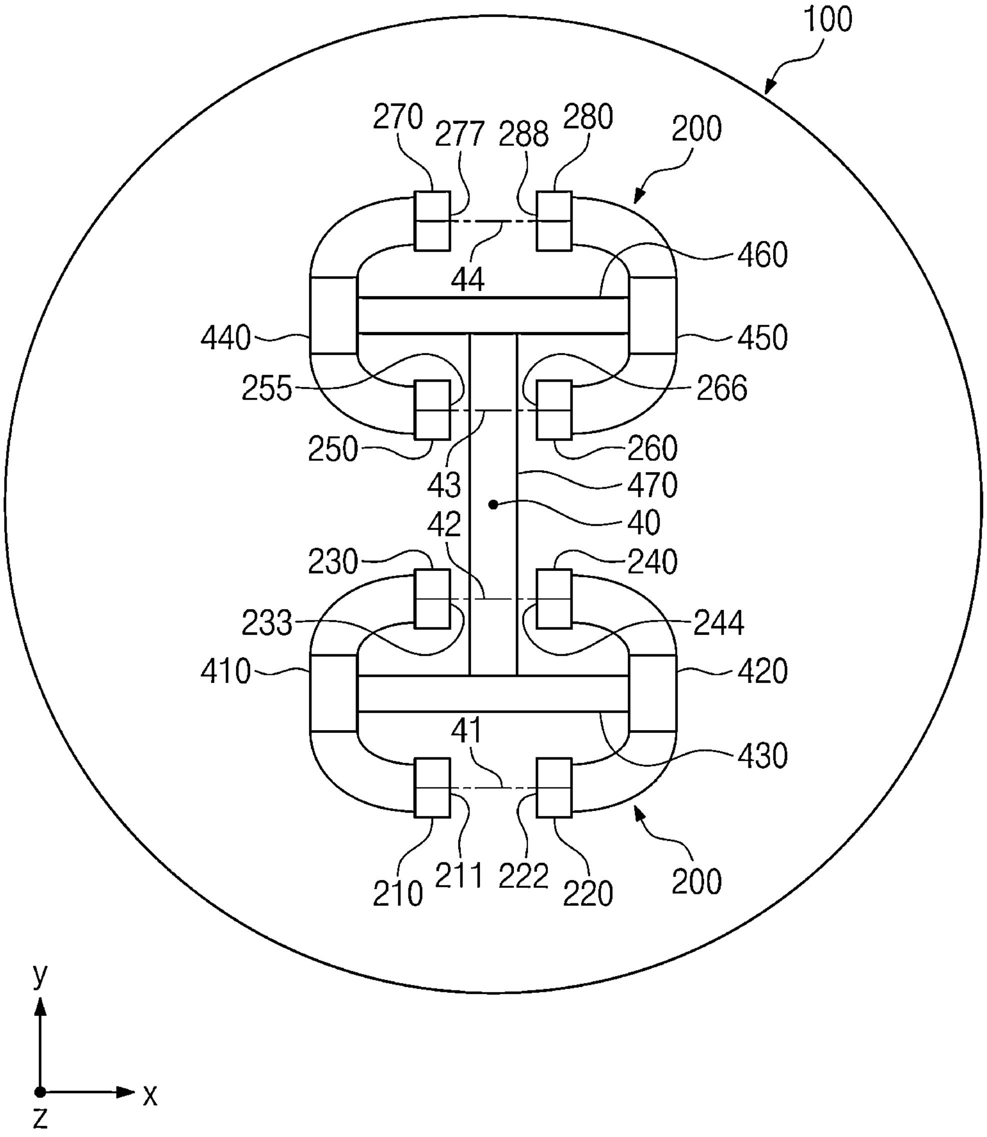
FIG. 10 is a view showing an upper diffuser according to the embodiments of the present invention.
Figure 11:
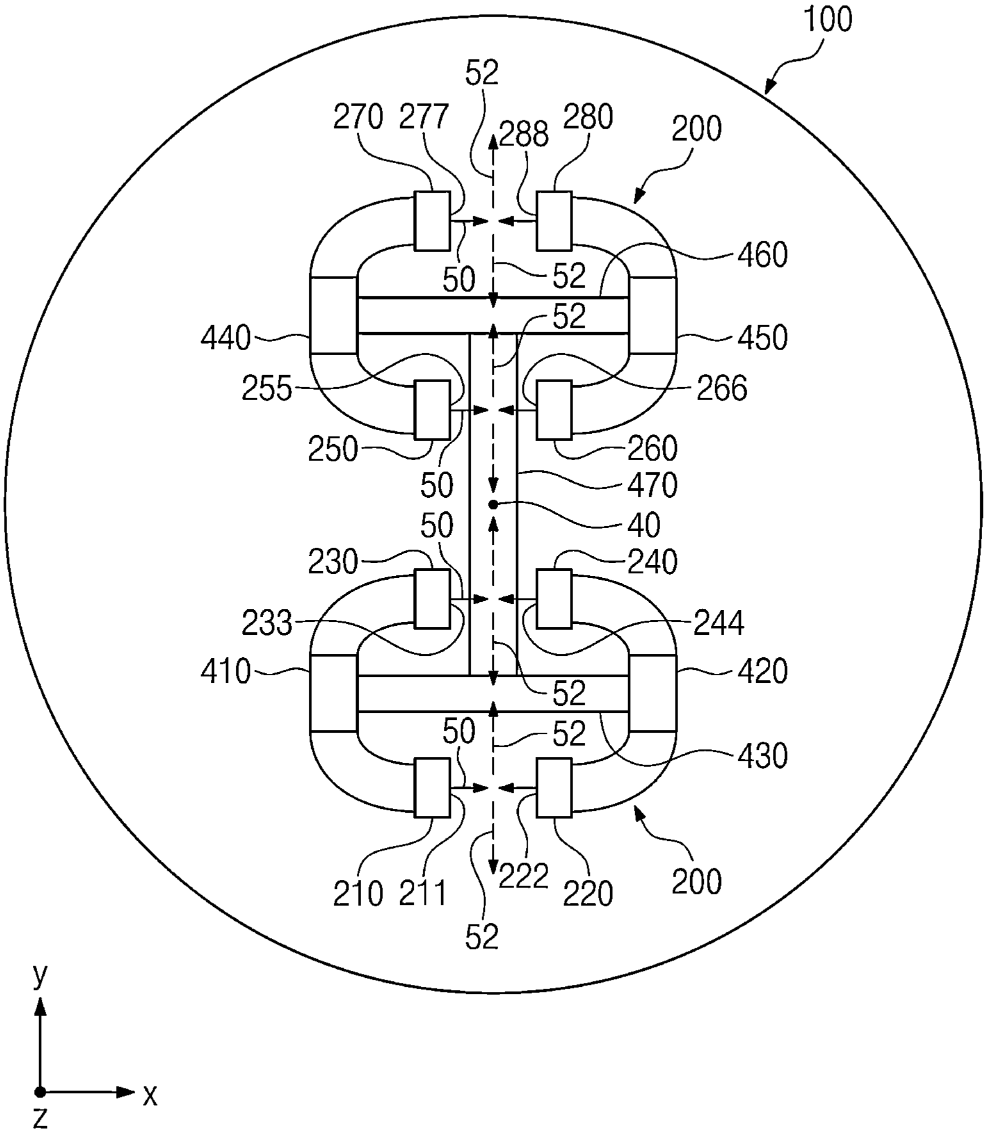
FIG. 11 is a view showing a driving process of the upper diffuser in FIG. 10.

FIG. 10 is a view showing the upper diffuser 200 according to still another embodiment of the present invention. FIG. 11 is a view showing the driving process of the upper diffuser 200 in FIG. 10.

Referring to FIGS. 10 and 11, the upper diffuser 200 includes first to eighth nozzles 210 to 280 and a supply pipe 400.

The first to fourth nozzles 210 to 240 may be provided in the same structure as the first to fourth nozzles 210 to 240 described in FIG. 7.

The fifth to eighth nozzles 250 to 280 may be provided in the same structure as the first to fourth nozzles 210 to 240. Specifically, the fifth nozzle 250 is spaced apart at a predetermined distance to face the sixth nozzle 260, and the seventh nozzle 270 is spaced apart at a predetermined distance to face the eighth nozzle 280. The third reference line 43 for connecting the center of the fifth discharge port 255 formed on one side of the fifth nozzle 250 to the center of the sixth discharge port 266 formed on one side of the sixth nozzle 260 is spaced apart at a predetermined distance from the first and second reference lines 41 and 42 so as to be parallel to each other. In addition, the fourth reference line 44 for connecting the center of the seventh discharge port 277 formed on one side of the seventh nozzle 270 to the center of the eighth discharge port 288 formed on one side of the eighth nozzle 280 is spaced apart at a predetermined distance from the third reference line 43 so as to be parallel to each other. The distance from the central axis 40 of the heat storage tank 100 to the first reference line 41 is the same as the distance to the fourth reference line 44, and the distance to the second reference line 42 is the same as the distance to the third reference line 43. In addition, the distance from the central axis 40 of the heat storage tank 100 to the second reference line 42 is the same as the distance between the first reference line 41 and the second reference line 42.

The supply pipe 400 is configured such that the first area 410 connects the first nozzle 210 to the third nozzle 230, and the second area 420 connects the second nozzle 220 to the fourth nozzle 240. In addition, the third area 430 connects the first area 410 to the second area 420. The fourth area 440 of the supply pipe 400 connects the fifth nozzle 250 to the seventh nozzle 270, and the fifth area 450 connects the sixth nozzle 260 to the eighth nozzle 280. In addition, the sixth area 460 connects the fourth area 440 to the fifth area 450, and the seventh area 470 connects the third area 430 to the sixth area 460. The above areas of the supply pipe 400 are provided with the same diameter. Due to the above-described structure of the supply pipe 400, hot water 20 may be supplied to the first to eighth nozzles 210 to 280 at the same flow rate and pressure.

The hot water 20 discharged from the fifth discharge port 255 and the hot water 20 discharged from the sixth discharge port 266 form vortex rings 50, respectively, are recombined with each other while colliding, and then form several secondary rings 52. In addition, the hot water 20 discharged from the seventh discharge port 277 and the hot water 20 discharged from the eighth discharge port 288 form vortex rings 50, respectively, are recombined with each other while colliding, and then form several secondary rings 52.

In the above-described upper diffuser 200, the collision of the vortex rings 50 formed by the first nozzle 210 and the second nozzle 220 and the collision of the vortex rings 50 formed by the seventh nozzle 270 and the eighth nozzle 280 have sizes and positions symmetrical about the central axis 40 of the heat storage tank 100. In addition, the collision of the vortex rings 50 formed by the third nozzle 230 and the fourth nozzle 240 and the collision of the vortex rings 50 formed by the fifth nozzle 250 and the sixth nozzle 260 have sizes and positions symmetrical about the central axis 40 of the heat storage tank 100. Accordingly, the hot water 20 may be stratified with a uniform density inside the heat storage tank 100.

The lower diffuser 300 may be provided in the same structure as the above-described upper diffuser 200. Accordingly, the cold water 30 may be stratified with a uniform density in the lower space 120 of the heat storage tank 100.

Although the present invention has been described in detail with reference to the preferred embodiments, the present invention is not limited to the specific embodiments and shall be interpreted by the following claims. In addition, it will be apparent that a person having ordinary skill in the art may carry out various deformations and modifications for the embodiments described as above within the scope without departing from the present invention.

What is claimed is:

1. A heat storage tank system comprising:

a heat storage tank formed therein with an internal space in which hot water and cold water are stratified, wherein:

the heat storage tank includes an upper circulation line that is configured to supply water to or from the heat storage tank via an upper external supply line, the heat storage tank includes a lower circulation line that is configured to supply water to or from the heat storage tank via a lower external supply line, supplying water to the heat storage tank via the upper external supply line causes the cold water to be expelled from the heat storage tank via the lower external supply line, and supplying water to the heat storage tank via the lower external supply line causes the hot water to be expelled from the heat storage tank via the upper external supply line;

an upper diffuser positioned in an upper space of the heat storage tank, the upper diffuser being hydraulically connected to the upper circulation line; and a lower diffuser positioned in a lower space of the heat storage tank, the lower diffuser being hydraulically connected to the lower circulation line, wherein each of the upper diffuser and the lower diffuser includes:

a first nozzle formed on one side thereof with a first port for providing water to or from the heat storage tank; and a second nozzle spaced apart at a first predetermined distance from the first nozzle and having a second port formed on one side thereof opposite to the one side of the first nozzle formed with the first port, the second port for providing water to or from the heat storage tank.

2. The heat storage tank system of claim 1, wherein the first port and the second port are provided as circular holes having an identical diameter.

3. The heat storage tank system of claim 1, wherein a reference line for connecting a center of the first port to a center of the second port is perpendicular to a central axis of the heat storage tank.

4. The heat storage tank system of claim 1, wherein the heat storage tank has a central axis positioned on a reference line for connecting a center of the first port to a center of the second port.

5. The heat storage tank system of claim 1, further comprising:

a third nozzle spaced apart at a second predetermined distance from the first nozzle and having a third port; and a fourth nozzle spaced apart at the first predetermined distance from the third nozzle, and having a fourth port, wherein a first reference line for connecting a center of the first port to a center of the second port and a second reference line for connecting a center of the third port to a center of the fourth port are parallel to each other.

6. The heat storage tank system of claim 5, wherein the first reference line and the second reference line are spaced apart from a central axis of the heat storage tank by an identical distance with the central axis interposed therebetween.

7. A heat storage system comprising:

a heat storage tank, wherein:

the heat storage tank includes an upper circulation line that is configured to supply fluid to or from the heat storage tank via an upper external supply line, the heat storage tank includes a lower circulation line that is configured to supply fluid to or from the heat storage tank via a lower external supply line, supplying fluid to the heat storage tank via the upper external supply line causes fluid to be expelled from the heat storage tank via the lower external supply line, and supplying fluid to the heat storage tank via the lower external supply line causes fluid to be expelled from the heat storage tank via the upper external supply line;

an upper diffuser positioned in an upper region of the heat storage tank, the upper diffuser being hydraulically connected to the upper circulation line that is configured to supply fluid to or from the heat storage tank, the upper diffuser including:

a first upper nozzle having a first upper port formed on a first side of the upper diffuser, and a second upper nozzle having a second upper port formed on a second side of the upper diffuser that is opposite to the first side of the upper diffuser, wherein the first upper nozzle faces the second upper nozzle; and a lower diffuser positioned in a lower region of the heat storage tank, the lower diffuser being hydraulically connected to the lower circulation line that is configured to supply fluid to or from the heat storage tank, the lower diffuser including:

a first lower nozzle having a first lower port formed on a first side of the lower diffuser, and a second lower nozzle having a second lower port formed on a second side of the lower diffuser that is opposite to the first side of the lower diffuser, wherein the first lower nozzle faces the second lower nozzle.

8. The heat storage system of claim 7, wherein the first upper port and the second upper port are provided as circular holes having an identical diameter.

9. The heat storage system of claim 7, wherein a reference line connecting a center of the first upper port to a center of the second upper port is perpendicular to a central axis of the heat storage tank.

10. The heat storage system of claim 7, wherein a reference line connecting a center of the first upper port to a center of the second upper port is positioned on a central axis of the heat storage tank.

11. The heat storage system of claim 7, further comprising:

a third upper nozzle spaced apart at a first predetermined distance from the first upper nozzle and formed on the first side of the upper diffuser, the third upper nozzle having a third upper port; and a fourth upper nozzle spaced apart at a second predetermined distance from the third upper nozzle, and having a fourth upper port formed on the second side of the upper diffuser, wherein (a) a first reference line connecting a center of the first upper port to a center of the second upper port and (b) a second reference line connecting a center of the third upper port and a center of the fourth upper port are parallel with each other.

12. The heat storage system of claim 11, wherein the first reference line is spaced apart from a central axis of the heat storage tank by a spaced distance, and the second reference line is spaced apart from the central axis of the heat storage tank by the spaced distance.

* * * * *